Patented Aug. 11, 1953

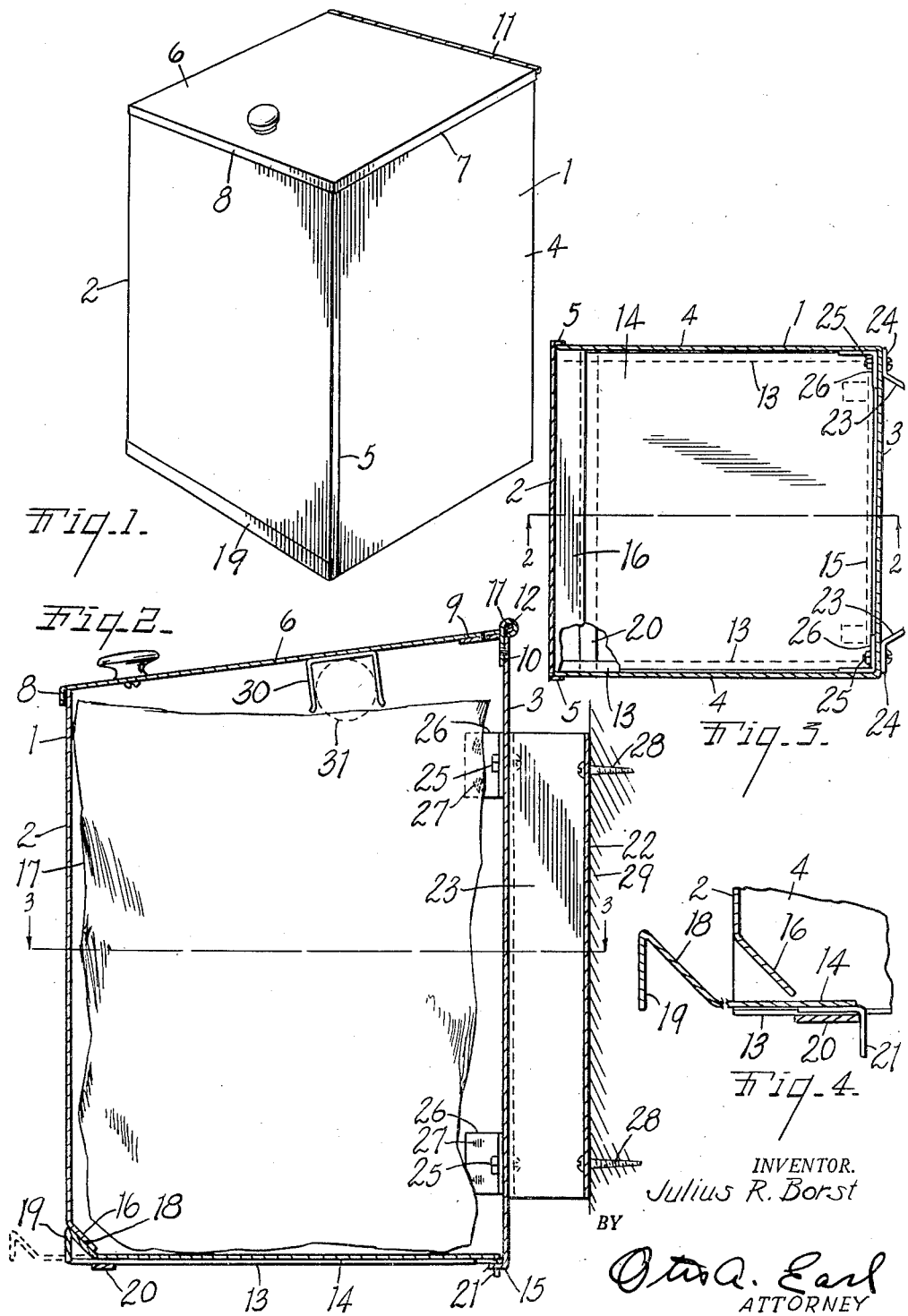

2,648,495

UNITED STATES PATENT OFFICE 2,648,495

GARBAGE RECEPTACLE

Julius R. Borst, East Moline, Ill., assignor to
C & J Industries, Moline, Ill.

Application June 16, 1950, Serial No. 168,611

8 Claims. (Cl. 24—43.5)

1

This invention relates to improvements in garbage receptacle.

The main objects of this invention are:

First, to provide a garbage receptacle which is convenient to use and which may be easily kept in a sanitary condition and one which cannot be opened or upset by animals.

Second, to provide a garbage receptacle having these advantages which is economical in structure and easily installed.

Objects relating to details and economies of the invention will appear from the description to follow. The invention is pointed out in the claims.

A preferred embodiment of the invention is illustrated in the accompanying drawing, in which:

Fig. 1 is a front perspective view of a garbage receptacle embodying my invention.

Fig. 2 is a vertical section on a line corresponding to line 2—2 of Fig. 3 with the receptacle mounted on a wall or other support which is conventionally illustrated.

Fig. 3 is a fragmentary horizontal section on a line corresponding to line 3—3 of Fig. 2.

Fig. 4 is an enlarged fragmentary vertical section with the bottom in withdrawn position.

The embodiment of my invention illustrated in the accompanying drawing comprises a body or wall unit 1 consisting of a front wall 2, rear wall 3 and side walls 4—4. In the embodiment illustrated the rear and side walls are formed integrally. The front wall 2 is provided with flanges 5 overlapping and secured to the side wall. The rear wall 3 projects above the front wall 2 and the top edges of the side walls are downwardly inclined so that the cover 6 is supported in a forwardly inclined position. The cover 6 is provided with side flanges 7 and a front flange 8 which close over the side and front walls.

The cover is hingedly connected to the upper edge of the rear wall by means of the piano type hinge members 9 and 10, the leaves of the hinge members being secured on the inner sides of the cover and rear wall respectively, as shown in the drawings, and extending across the same providing reinforcing elements. The hinge members 9 and 10 are provided with interengaging knuckles 11 which receive the pintle 12 thereby providing a very rigid hinge connection for the cover and as stated, the hinge constitutes a stiffening element for the parts to which they are attached. The wall unit is open at the bottom, the side walls being provided with inturned flanges 13 at the bottom thereof these flanges constituting slides for the bottom 14.

2

The rear wall is provided with an inturned flange 15 at the bottom over which the rear edge of the bottom extends when in its closed position as shown in Figs. 2 and 3. The front wall has an inwardly and downwardly inclined scraper 16 formed integrally therewith which is adapted to scrape contents from the bottom as the bottom is withdrawn. The receptacle is designed for use with a bag-like liner 17 but sometimes material may drop down around the liner or moisture collect and freeze on the bottom. The scraper removes any such accumulation and it is scraped into the portable receptacle placed below the garbage receptacle to receive the garbage therefrom.

The front end of the bottom is upwardly inclined at 18 to close against the front side of the scraper as is shown in Fig. 2 and is then turned downwardly to provide a fingerpiece 19. This provides an effective and neat appearing closure for the front wall opening as well as a grip for the bottom. To limit the withdrawal of the bottom we provide a stop crosspiece 20, the bottom being provided with downwardly projecting stops 21 adapted to coact therewith as shown in Fig. 4. These stops 21 are desirably positioned adjacent the side edges of the bottom and serve, in effect, to line up the bottom in withdrawn positions so that it is easily closed.

The mounting bracket 22 is of channel section being formed of sheet metal and its forwardly projecting arms 23 diverge outwardly. The arms terminate in outturned flanges 24 receiving the bolts 25 passed through the rear wall and engaging the angular reinforcing brackets 26 which are arranged in the rear corners of the wall unit and vertically positioned to receive the bolts. These corner brackets are fixedly secured desirably by spot welding as indicated at 27. The web portion of the bracket is adapted to receive the attaching screws 28 engaging the support indicated at 29. By thus forming the bracket with the outwardly diverging arms 23 an effective bracing action results.

The cover is provided with a clip 30 adapted to receive an insecticide or disinfectant dispenser indicated by dotted lines at 31. The clip is designed to receive certain commercial dispensers of DDT or like material.

I have illustrated and described my invention in a highly practical embodiment thereof. I have not attempted to illustrate or describe certain embodiments or adaptations which I contemplate as it is believed that this disclosure will enable those skilled in the art to embody or adapt my invention as may be desired.

Having thus described my invention, what I claim as new and desire to secure by Letters Patent is,

1. A garbage receptacle comprising a wall unit of rectangular horizontal section open at the top and bottom and having front, rear and side walls, said side and rear walls having inturned flanges at the bottoms thereof, the bottom flanges of the side walls constituting bottom slideways, a bottom slidable on said ways, the front wall terminating in an inwardly inclined downwardly projecting portion constituting a scraper coacting with the bottom as it is withdrawn to open the receptacle at the bottom, the front edge portion of said bottom being upwardly inclined to engage the said scraper when the bottom is in closed position, said upwardly inclined portion having a downturned flange on its front edge spaced from the lower portion of said inclined portion to constitute a fingerpiece, having a downwardly opening finger receiving recess, said inwardly inclined downwardly projecting portion of the front wall being inclined inwardly a substantial distance from the general plane of said front wall to provide said scraper and to provide a recess within the general plane of the front wall for receiving said fingerpiece, a crosspiece extending between said slideways on said side walls adjacent the front ends thereof, said cross piece bracingly connecting said slideways and side walls, and downturned stops on said bottom positioned at the rear and adjacent the side edges thereof and adapted to engage said crosspiece when the bottom is in withdrawn position.

2. A garbage receptacle comprising a wall unit of rectangular horizontal section open at the top and bottom and having fixedly connected front, rear and side walls, a cover hingedly connected to the top of the rear wall, said side and rear walls having inturned flanges at the bottoms thereof, the bottom flanges of the side walls constituting bottom slideways, a bottom slidable on said ways, the front wall terminating in an inwardly inclined downwardly projecting portion constituting a scraper coacting with the bottom as it is withdrawn to open the receptacle at the bottom, said bottom having a fingerpiece at its front edge, said inwardly inclined downwardly projecting portion of the front wall being inclined inwardly a substantial distance from the general plane of said front wall to provide said scraper and to provide a recess within the general plane of the front wall for receiving said finger piece, a crosspiece extending between said slideways on said side walls adjacent the front ends thereof, said cross piece bracingly connecting said slideways and side walls, and a downturned stop on said bottom positioned to engage said crosspiece when the bottom is in withdrawn position.

3. A garbage receptacle comprising a wall unit of rectangular horizontal section open at the top and bottom and having fixedly connected front, rear and side walls, said side walls having inwardly projecting flanges adjacent the bottoms thereof, the bottom flanges of the side walls constituting bottom slideways, and a bottom slidable on said ways, the front wall terminating in an inwardly inclined downwardly projecting portion constituting a scraper coacting with the bottom as it is withdrawn to open the receptacle at the bottom, said bottom having a fingerpiece at its front edge, said inwardly inclined downwardly projecting portion of the front wall being inclined inwardly a substantial distance from the general plane of said front wall to provide said scraper and to provide a recess within the general plane of the front wall for receiving said finger piece.

4. A garbage receptacle comprising a wall unit of rectangular horizontal section open at the top and bottom and having fixedly connected front, rear and side walls, said side walls having slideways adjacent the bottoms thereof, a bottom slidably mounted on said slideways, the front wall terminating in an inwardly inclined downwardly projecting portion constituting a scraper coacting with the bottom as it is withdrawn to open the receptacle at the bottom, the front edge of said bottom being upwardly inclined to engage the said scraper when the bottom is in closed position, said upwardly inclined portion having a downturned flange on its front edge spaced from the lower portion of said inclined portion to constitute a finger piece having a downwardly opening finger receiving recess, said front wall inwardly inclined portion providing a recess in the front wall for receiving said finger piece.

5. A garbage receptacle comprising a wall unit of rectangular horizontal section open at the top and bottom and having fixedly connected front, rear and side walls, said side walls having slideways adjacent the bottoms thereof, a bottom slidably mounted on said slideways, the front wall terminating in an inwardly and downwardly projecting portion constituting a scraper coacting with the bottom as it is withdrawn to open the receptacle at the bottom, the front edge of said bottom being upwardly inclined to engage the said scraper when the bottom is in closed position, said upwardly inclined portion having a downturned flange on its front edge spaced from the lower portion of said inclined portion to constitute a fingerpiece having a downwardly opening finger receiving recess, said inwardly and downwardly projecting portion of the front wall providing a recess in the front wall for receiving said finger piece.

6. A garbage receptacle comprising a wall unit of rectangular horizontal section open at the top and bottom and having fixedly connected front, rear and side walls, a cover for said receptacle supported by said walls for opening and closing the receptacle at the top thereof, a bottom supported by said walls for opening and closing the receptacle at the bottom thereof, a mounting bracket of channel section having forwardly diverging arms provided with outturned flanges on their front edges disposed against the rear wall of the receptacle with the edges thereof substantially flush with the sides of the receptacle, and attaching bolts arranged through said mounting bracket flanges and the rear wall of the receptacle, said receptacle having angular reinforcing brackets disposed within the rear corners thereof and secured to the side and rear walls and receiving said bolts, said bracket being of sheet metal conformed to channel section and being vertically elongated and connected by said attaching bolts to the rear wall adjacent the top and bottom thereof.

7. A garbage receptacle comprising a wall unit of rectangular horizontal section open at the top and bottom and having fixedly connected front, rear and side walls, a cover for said receptacle supported by said walls for opening and closing the receptacle at the top thereof, a bottom supported by said walls for opening and closing the receptacle at the bottom thereof, a mounting bracket of channel section having forwardly diverging arms provided with flanges on their front edges disposed against the rear wall of the receptacle, and attaching bolts arranged through said mounting bracket flanges and the rear wall of the receptacle, said bracket being of sheet metal conformed to channel section and being vertically elongated and connected by said attaching bolts to the rear wall adjacent the top and bottom thereof.

8. A garbage receptacle comprising a wall unit open at the bottom and having fixedly connected front, rear and side walls, said side walls having slideways adjacent the lower edges thereof, a bottom slidable on said slideways, the front wall having an inwardly and downwardly projecting portion constituting a scraper coacting with the bottom as it is withdrawn, said bottom having a portion projecting laterally thereof adjacent the front edge thereof to constitute a finger piece, said front wall inwardly and downwardly projecting portion projecting for a substantial distance inwardly of the general plane of the front wall to provide a recess in the front wall within the general plane thereof for receiving said finger piece when the bottom is moved to closed position.

JULIUS R. BORST.

References Cited in the file of this patent

UNITED STATES PATENTS

| Number | Name | Date |
|---|---|---|
| 654,402 | King | July 24, 1900 |
| 938,964 | Brown | Nov. 2, 1909 |
| 988,584 | Milgrom | Apr. 4, 1911 |
| 1,115,375 | Bachowski et al. | Oct. 27, 1914 |
| 1,238,090 | Beringer | Aug. 28, 1917 |
| 1,239,307 | Schmid | Sept. 4, 1917 |
| 1,867,080 | Kraft | July 12, 1932 |
| 2,299,674 | Austin | Oct. 20, 1942 |
| 2,333,519 | Callander | Nov. 2, 1943 |
| 2,406,587 | Cooper | Aug. 27, 1947 |
| 2,549,572 | Campanelli | Apr. 17, 1951 |

FOREIGN PATENTS

| Number | Country | Date |
|---|---|---|
| 29,508 | Great Britain | Dec. 22, 1913 |
| 56,798 | Norway | July 6, 1936 |
| 114,416 | Australia | Jan. 15, 1942 |